United States Patent
Shinotsuka et al.

(10) Patent No.: US 7,176,435 B2
(45) Date of Patent: Feb. 13, 2007

(54) IMAGE SENSOR WITH A VOLTAGE SWITCHING CIRCUIT FOR LOW AFTERGLOW

(75) Inventors: Sukeyuki Shinotsuka, Sayama (JP); Nobuhiro Fueki, Sayama (JP); Jiro Kurita, Sayama (JP); Katsuhiko Takebe, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 785 days.

(21) Appl. No.: 09/848,471

(22) Filed: May 3, 2001

(65) Prior Publication Data

US 2002/0041404 A1 Apr. 11, 2002

(30) Foreign Application Priority Data

| Oct. 5, 2000 | (JP) | ............................. 2000-344425 |
| Nov. 1, 2000 | (JP) | ............................. 2000-373539 |
| Feb. 6, 2001 | (JP) | ............................. 2001-071256 |

(51) Int. Cl.
*H03F 3/08* (2006.01)
*H04N 3/14* (2006.01)

(52) U.S. Cl. ............................. 250/214 L; 250/214 R; 348/308

(58) Field of Classification Search ............ 250/214 A, 250/214 R, 208.1, 214 C; 348/300–304, 348/308
See application file for complete search history.

(56) References Cited

U.S. PATENT DOCUMENTS 5,808,677 A * 9/1998 Yonemoto .................. 348/308

5,933,190 A * 8/1999 Dierickx et al. ............ 348/302
6,252,462 B1 * 6/2001 Hoffman .................... 330/308
2005/0167602 A1 * 8/2005 Dierickx ................ 250/370.01

FOREIGN PATENT DOCUMENTS

| JP | 5-219443 | 8/1993 |
| JP | 7-46481 | 2/1995 |

* cited by examiner

*Primary Examiner*—Thanh X. Luu
*Assistant Examiner*—Stephen Yam
(74) *Attorney, Agent, or Firm*—Fulbright & Jaworski L.L.P.

(57) ABSTRACT

Disclosed is an image sensor consisting of light sensor circuits arranged to form an array of pixels, each of which produces in a photoelectric converting element a sensor current proportional to the quantity of light falling thereon and converts the sensor current into a voltage signal by a MOS type transistor with a logarithmic output characteristic in a weak inverse state, wherein a means for changing over a drain voltage of the transistor for each light sensor circuit to a value lower than a normal value for a specified time to remove a charge accumulated in a parasitic capacity of the photoelectric converting element to initialize the circuit before detecting a light signal. The image sensor can obtain a voltage signal corresponding to the quantity of incident light even if the sensor current was rapidly changed, thereby eliminating the possibility of occurrence of afterglow of each pixel even at a small quantity of incident light.

4 Claims, 10 Drawing Sheets

IMAGE SENSOR WITH A VOLTAGE SWITCHING CIRCUIT FOR LOW AFTERGLOW

BACKGROUND OF THE INVENTION

The present invention relates to an image sensor composed of a matrix of light sensor circuits, each of which represents a unit pixel and is capable of producing in an photoelectric converting element a sensor current proportional to the quantity of light falling thereon and converting the sensor current into a voltage signal by using a MOS type transistor with a logarithmic output characteristic in a weak inverse state.

Figure 1:
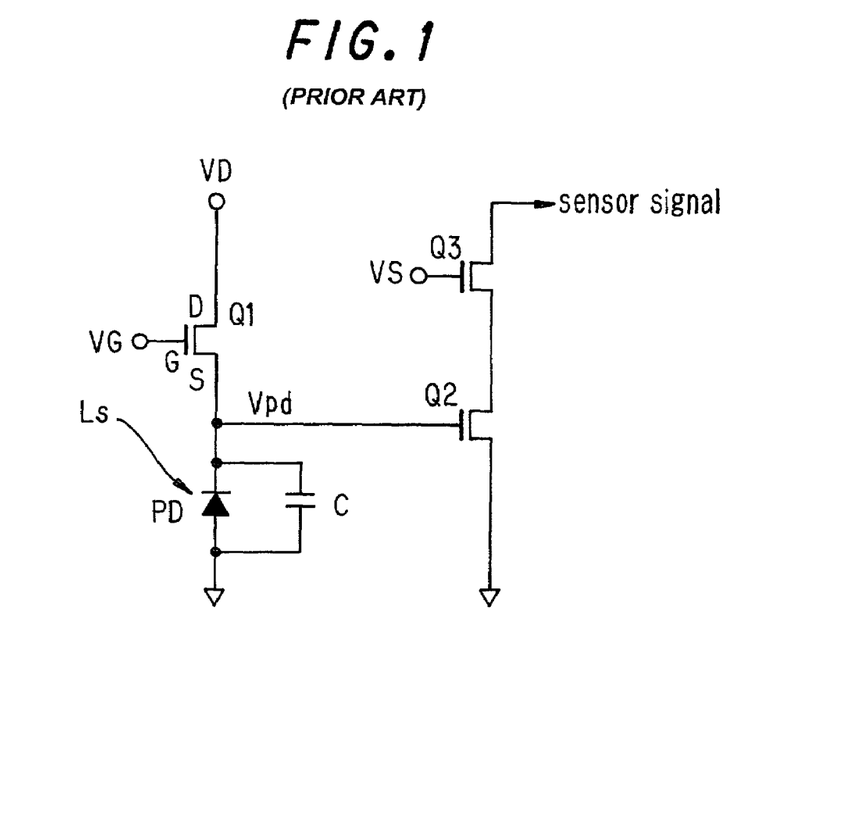
FIG. 1 is an electric circuit diagram of a light sensor circuit for one pixel, which is used as a unit component of an image sensor according to the present invention.

Japanese Laid-open Publication of Unexamined Applications KOKAI No. 219443 (1993) and Japanese Publication of Examined Applications KOKOKU No. 46481 (1995) disclose typical conventional MOS transistor type image sensors, in which a light sensor circuit for one pixel comprises, such as shown in FIG. 1 hereof, a photo-diode PD operating as a photoelectric converting element for producing a sensor current proportional to the quantity of incident light Ls falling thereon, a transistor Q1 having a logarithmic output characteristic in a weak inverse state for converting the sensor current produced in the photodiode into a voltage signal Vpd by using the property of its sub-threshold region, a transistor Q2 for amplifying the voltage signal Vpd and a transistor Q3 for outputting a sensor signal in accordance with a timing pulse of a readout signal Vs and which is characterized by its a wide dynamic range obtained by giving the output a logarithmic characteristic, thereby achieving the high sensitivity of detecting a light signal.

However, the prior-art image sensor using light sensor circuits as respective pixels, in which a sensor current proportional to incident light is produced in photo-electric converting element and converted into voltage signal by using a MOS type transistor having logarithmic output characteristic in a weak inverse state, still involves such a problem that it may suffer the occurrence of unwanted afterglow of each pixel with a decreased quantity of incident illumination falling on the photoelectric converting element.

The above-mentioned light sensor circuit can produce a sensor current in the transistor Q1 while a sufficient quantity of light Ls is falling on the photodiode PD and can therefore detect a light signal at a response speed sufficient not to produce an afterimage of the pixel owing to a relatively small value of resistance of the transistor Q1. However, the transistor Q1 is set to operate with resistance increased by one order when a current therein decreases by one order. Therefore, decreasing the current flowing in the transistor Q1 with a decrease in the quantity of incident light Ls falling to the photodiode PD causes the transistor Q1 to rapidly increase its resistance. A time constant of the circuit containing a parasitic capacity C (junction capacity plus wiring stray capacity) of the photodiode PD with the increased resistance is increased to elongate time necessary for removing electric charge accumulated in the parasitic capacity C. As a result, an afterimage can be viewed for a longer duration as the quantity of incident light Ls decreases.

Figure 5:
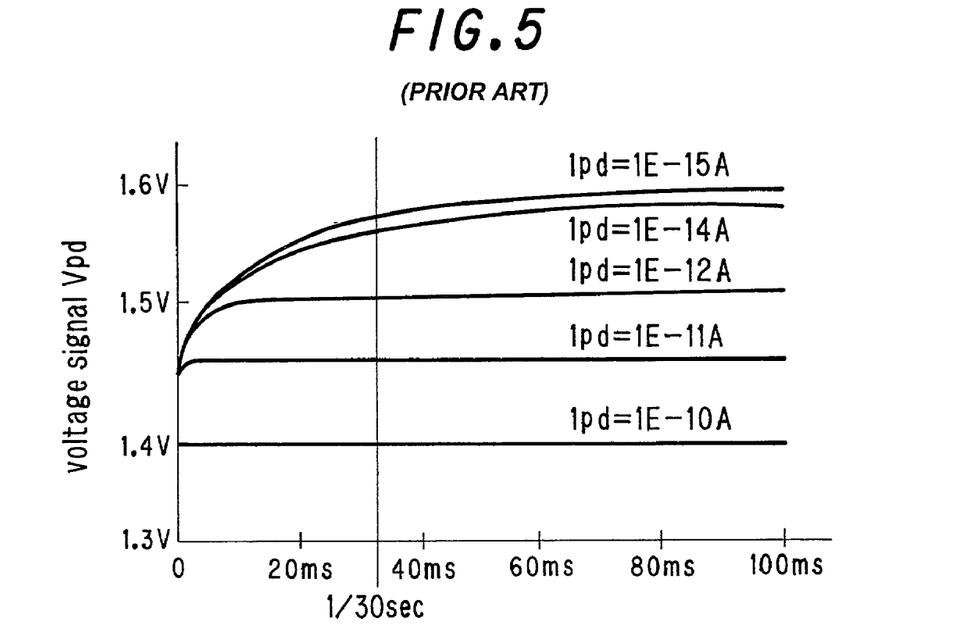
FIG. 5 shows characteristic curves of a voltage signal (Vpd) changing with a change of a sensor current of a photodiode (PD) in the light sensor circuit.

FIG. 5 shows characteristics of a variable voltage signal Vpd when the sensor current in the photodiode PD rapidly changes from a value 1 E–10 A to a value 1 E–15 A in a conventional sensor system.

The diagram indicates that, in case of outputting a sensor signal at an interval of $\frac{1}{30}$ seconds, a voltage signal Vpd can not be saturated within the above duration with a sensor current 1 E–12 A corresponding to the decreased quantity of the incident light falling on the photodiode PD. In other words, the time necessary for saturating the voltage signal Vpd is elongated correspondingly with a decreased value of a sensor current with a decreased quantity of the incident light Ls to the photodiode PD.

Figure 13:
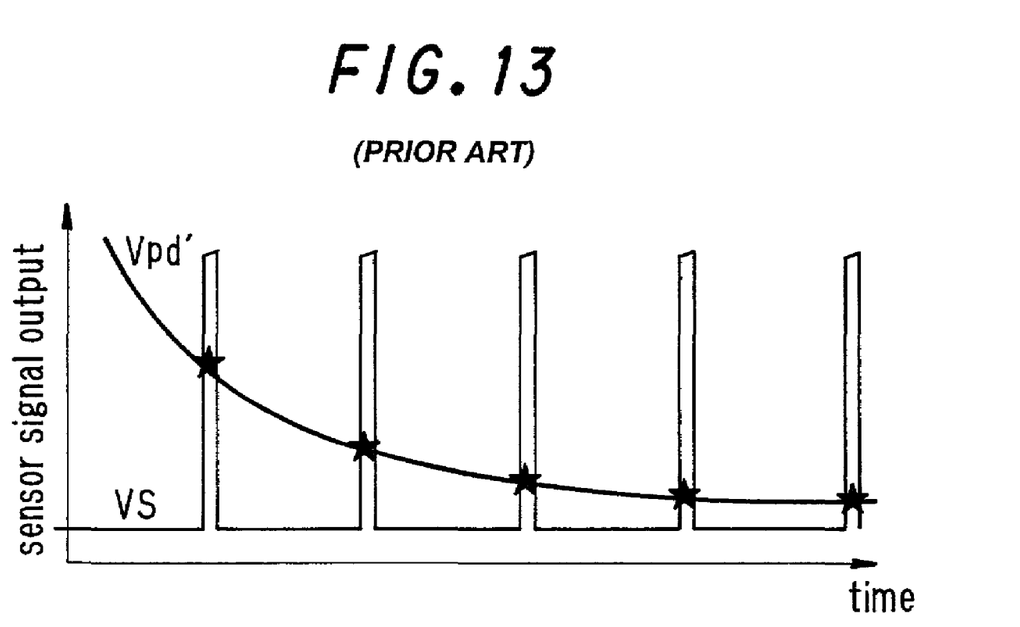
FIG. 13 shows output characteristics of a sensor signal read in accordance with a specified timing pulse at the decreased quantity of incident light falling on a light sensor circuit without initialization of the image sensor.

Therefore, if a sensor signal is output in accordance with timing pulses of a reading signal Vs as shown in FIG. 13, an output appears with such an afterglow that may be of a higher level at an earlier time. In FIG. 13, Vpd' designates an inverse amplified voltage signal produced by the amplifying transistor Q2 in a conventional sensor system.

SUMMARY OF THE INVENTION

An object of the present invention is to provide an image sensor composed of an array of light sensor circuits, each of which represents a unit pixel and is capable of producing in a photoelectric converting element a current proportional to the quantity of incident light falling on it and converting the current into a corresponding voltage signal by using a MOS type transistor with a logarithmic output characteristic in a weak inverse state and which is further provided with means for initializing the circuit before detecting a light signal by removing a charge accumulated in a parasitic capacitor of the photoelectric converting element by switching a drain voltage of the transistor from a normal to a lower level for a specified time.

Another object of the present invention is to provide an image sensor consisting of light sensor circuits arranged to form a matrix of pixels-circuits, each of which is capable of producing in a photoelectric element a current proportional to the quantity of incident light falling on it and converting the current into a corresponding voltage signal by using a MOS type transistor with a logarithmic output characteristic in a weak inverse state. This image sensor is further provided with a voltage switching-over circuit that can change drain voltages of the transistors for all pixels from a normal to a lower level for a specified time to remove charges accumulated in parasitic capacities of respective photoelectric converting elements, thereby initializing all pixels before detecting light signals from them. Therefore, even if the sensor current rapidly decreases with a decreased illumination, each sensor circuit may immediately obtain a voltage signal corresponding to the incident light quantity at that moment, thereby eliminating the possibility of occurrence of afterglow of the pixel at a decreased quantity of incident light.

A further object of the present invention is to provide an image sensor consisting of light sensor circuits arranged to form a matrix of plural corresponding pixels, wherein sensor signals are read out (scanned) in a time series in such a manner that pixel lines are successively selected one by one by a pixel-line selecting circuit and pixels in the selected pixel line are successively selected by a pixel selecting circuit, and wherein each pixel in each pixel line to be selected is initialized at the timing adapted to reading each pixel from the line in such a manner that a drain voltage of a MOS transistor for a target pixel is changed by a voltage switching-over circuit from a normal to a lower level for a specified time to remove a charge accumulated in a parasitic capacity of a related photoelectric converting element.

PREFERRED EMBODIMENTS OF THE PRESENT INVENTION

FIG. 1 illustrates a light sensor circuit representing a unit pixel, which is used as a unit component in an image sensor embodying the present invention.

The light sensor circuit comprises a photodiode PD for producing a sensor current proportional to the quantity of incident light Ls when detecting a light signal, a transistor Q1 for converting the sensor current flowing in the photodiode PD into a corresponding voltage Vpd by using its logarithmic output characteristic in a weak inverse state, a transistor Q2 for amplifying the voltage signal Vpd and a MOS type transistor Q3 for outputting a sensor signal in accordance with a timing pulse of a read-out signal Vs. This sensor is capable of detecting a light signal at a high sensitivity owing to its wide dynamic range achieved by utilizing its logarithmic output characteristic.

The light sensor circuit according to the present invention is capable of initializing itself before detecting a light signal by removing any electric charge accumulated in a parasitic capacity C of the photodiode PD by changing a drain voltage VD of the MOS type transistor Q1 to a level lower than a normal for a specified period. For example, without limiting the scope of the present invention, the normal drain voltage in a typical circuit of this type is 2.8V (volts) and the threshold level of transistor Q1 is 0.8V, whereby a "lower" voltage is below 2.0 VG (i.e. less than 2.8V−0.8V). This enables the light sensor circuit to immediately obtain a voltage signal corresponding to the quantity of light falling on it at that time even if a sensor current rapidly changed. Thus, the light sensor circuit may not cause an afterglow of the pixel even with a small quantity of incident light Ls.

Figure 2:
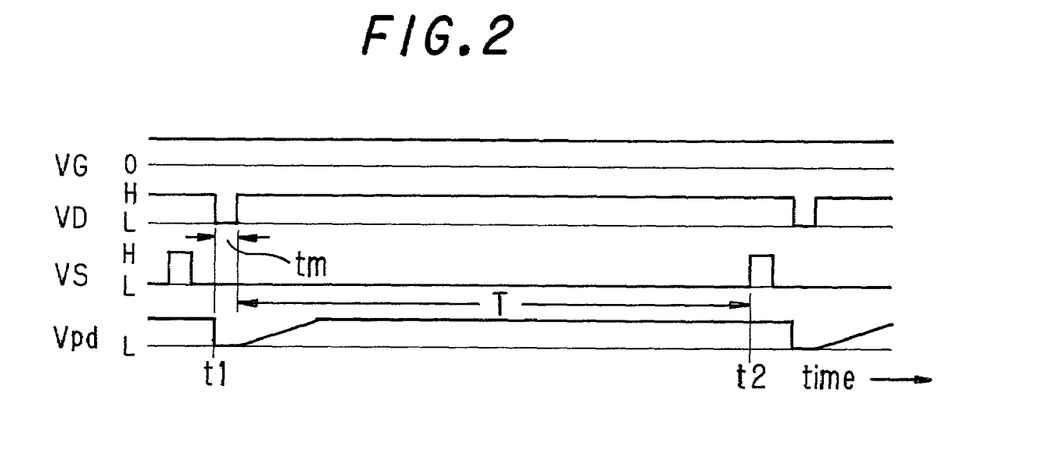
FIG. 2 is a time chart of signals to be generated in the light sensor circuit.

FIG. 2 shows a time chart of signals produced at various portions of the light sensor circuit. In FIG. 2, t1 is the initializing timing pulse and t2 is the light-signal detection timing pulse. A specified time tm for which the drain voltage VD of the transistor Q1 is switched from a normal value (high level H) to a lower voltage value (low level L) and kept at the low level L is set for example to about 5 microseconds in case of reading a pixel at a speed of about 100 nanoseconds. In FIG. 2, T designates a period for accumulating a charge in a parasitic capacity C of the photodiode PD, which period is about ⅓₀ (or ⅙₀) sec. for a NTSC signal.

In the light sensor circuit, once the drain voltage VD of the MOS type transistor Q1 was switched over to the low level L for initializing the circuit, the transistor Q1 is brought into the low-resistance state if a potential between the gate voltage VG and the drain voltage VD is greater than a threshold of the transistor Q1. Therefore, the source side potential at that moment becomes equal to the drain voltage VD (a difference between potentials still remains in practice), causing the parasitic capacity C of the photodiode PD to be discharged.

Figure 3:
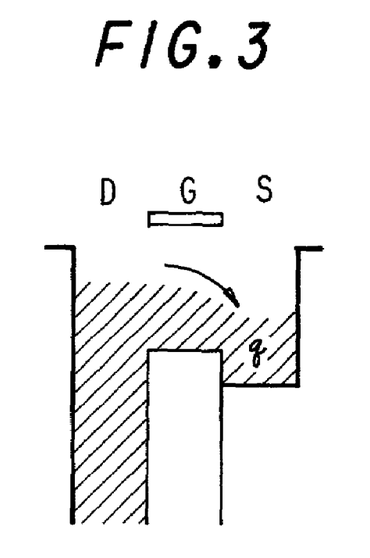
FIG. 3 is a mimic illustration of operation state of a transistor Q1 with a flow of an electric charge (q) therein when initializing the light sensor circuit.

FIG. 3 schematically illustrates the operation of the light sensor circuit by a flow of electric charge q of the transistor Q1 when initializing the circuit.

Once the drain voltage VD of the transistor Q1 was changed to the normal value (high level H) with an elapse of the time tm and a light signal was then detected, the source side potential becomes lower than the drain voltage VD. If the difference between the gate voltage VG and the drain voltage is larger than the threshold, the MOS type transistor Q1 reaches the low-resistance state and allows the junction capacity C of the photodiode to be charged again.

Figure 4:
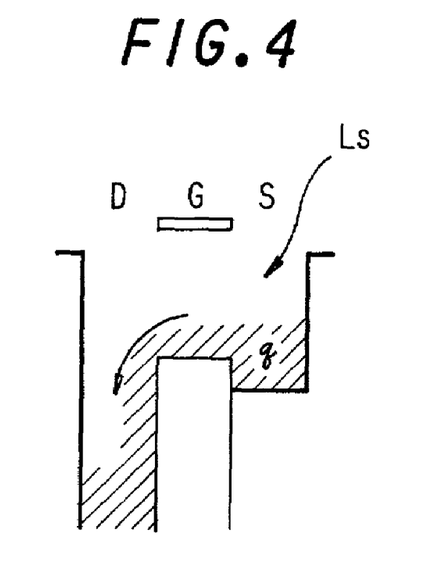
FIG. 4 is a mimic illustration of operation state of a transistor Q1 with a flow of an electric charge (q) therein when detecting a light signal of the light sensor circuit.

FIG. 4 schematically illustrates the operation of the light sensor circuit by a flow of electric charge q of the transistor Q1 when detecting a light signal. The parasitic capacity C of the photodiode PD is discharged for initializing the light sensor circuit before detecting a light signal and then charged. In this case, the output voltage Vpd (a terminal voltage of the photodiode PD) with an elapse of a specified time from the initializing timing becomes a value corresponding to the quantity of incident light Ls. In other words, the light sensor circuit after initialization can obtain a discharging characteristic with a specified time constant in response to a change in the quantity of incident light.

In that case, if the light sensor circuit is left as it is for a long time, a current supplied from the drain voltage VD through the transistor Q1 becomes equal to a current flowing in the photodiode PD. The same discharging characteristic can be thus always maintained as far as no charge remains. This eliminates the possibility of afterglow of pixels.

The light sensor circuit can therefore obtain a sensor signal corresponding to the quantity of incident light Ls with no afterglow of the pixel by detecting a light signal with an elapse of a specified time after initialization of the circuit.

FIG. 5 illustrates the changing characteristics of a voltage signal Vpd with a current rapidly changed from 1 E−10 A to 1 E−15 A in the case of detecting a light signal at a moment of ⅓₀ sec. after the initialization in a conventional sensor system.

Figure 6:
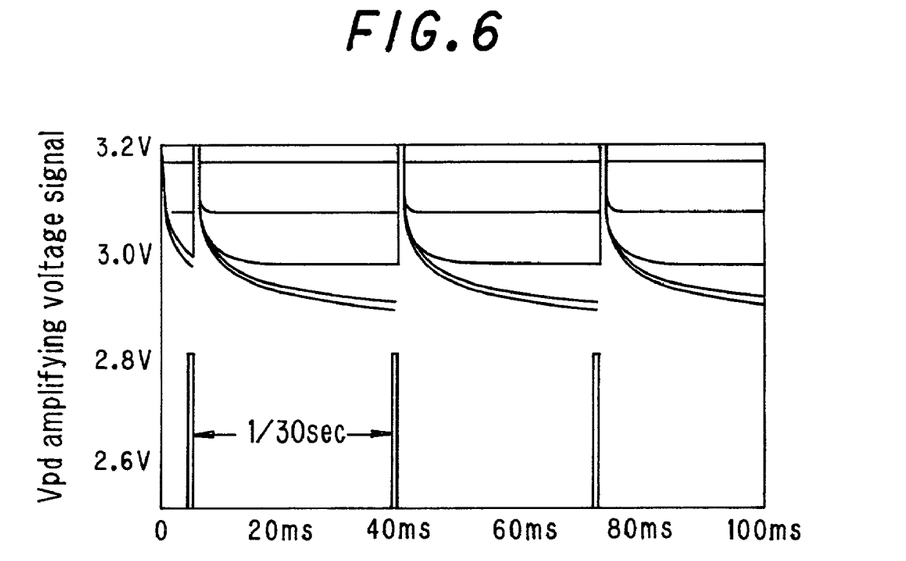
FIG. 6 shows characteristic curves of a voltage (Vpd) amplifying signal when the light signal reading-out operation is repeated at a specified interval by the light sensor circuit.

FIG. 6 shows characteristics of the amplified voltage signal Vpd when light signals were repeatedly read at an interval of ⅓₀ second in the system of this invention. The diagram indicates that the signal characteristics obtained every ⅓₀ second corresponds to the sensor current proportional to the quantity of incident light failing on the photodiode PD with no afterglow of the pixel.

Figure 7:
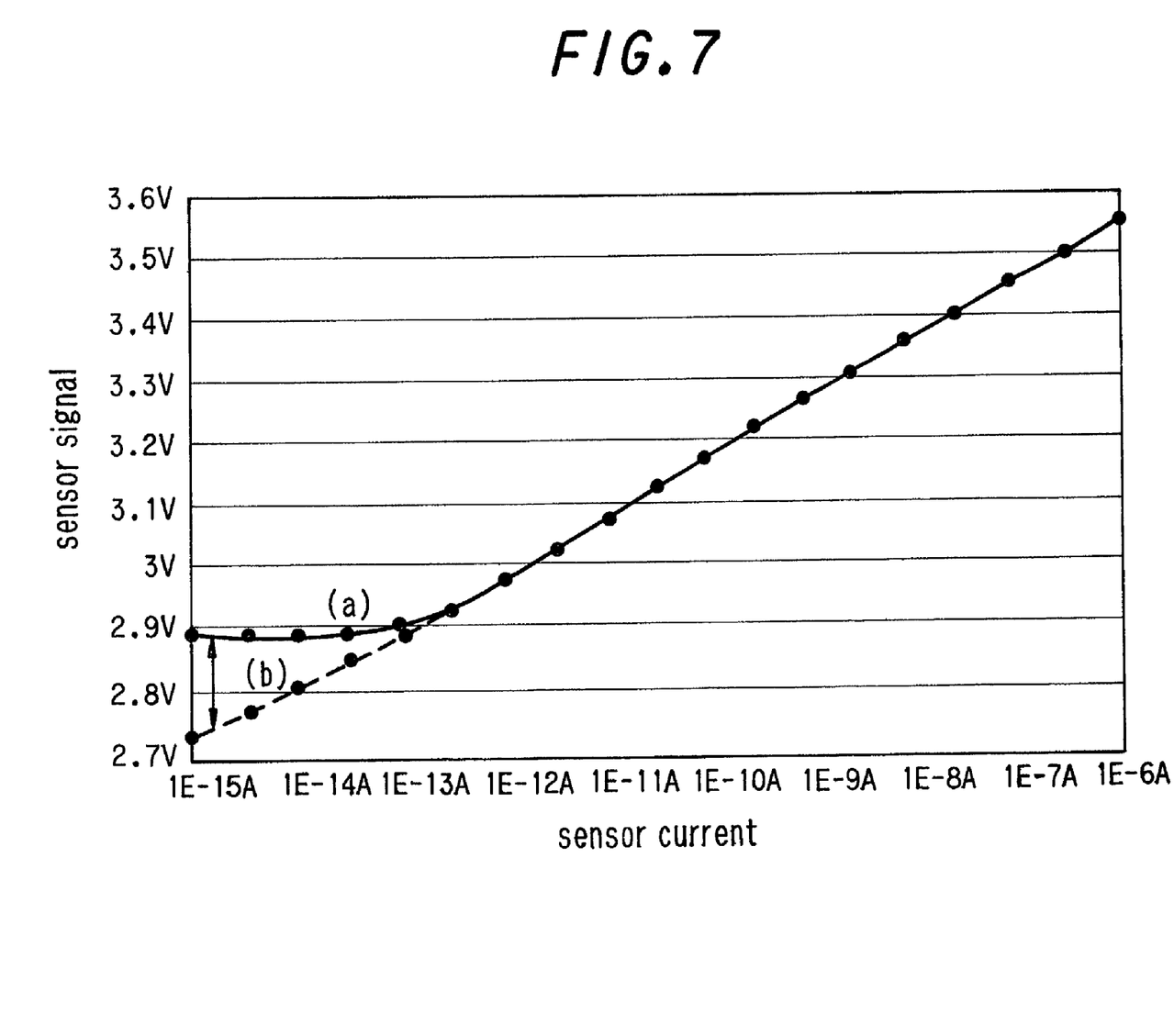
FIG. 7 shows output characteristics of pixel signals (Vo) with a change of the quantity of incident light (Ls) falling on a photodiode of the light sensor circuit.

FIG. 7 shows the output characteristics of the sensor signal, which were obtained by changing the quantity of incident light Ls falling on the photodiode. The diagram indicates that the sensor signal has a complete logarithmic output characteristic at the sensor current of 1 E−13 A or more (i.e. 1 E minus 13 A through 1 E minus 6 A, as shown). It is also found that the output sensor signal is not logarithmic at the sensor current of less then 1 E−13 A but this does not cause afterglow.

The diagram also indicates that the output characteristic shown at (a) in FIG. 7 can be obtained by adjusting the threshold of the low level L to which the drain voltage VD of the transistor Q1 must be changed over and by decreasing the drain voltage until the transistor Q1 reaches the state of completely low resistance. On the contrary, the normal logarithmic output characteristic shown at (b) in FIG. 7 can be obtained by setting the control voltage VD to the same value as the gate voltage VG.

Therefore, the output characteristic (a) of FIG. 7 is free from the afterglow effect but the light signal detecting sensitivity is decreased with a small quantity of incident light while the output characteristic (b) of FIG. 7 may have a high detection sensitivity at a small quantity of incident light but is accompanied by a remarkable afterglow. In other words, there is a trade-off relation between the detection sensitivity and afterglow.

Therefore, it is desirable to adjust the drain voltage VD of the transistor to a value in an intermediate region between the output characteristic (a) shown in FIG. 7 and the logarithmic output characteristic (b) as shown in FIG. 7 on the following condition:

For the applications where the afterglow is acceptable, the drain voltage of the transistor must be set to a value at which the higher detection sensitivity is obtained. On the contrary, for the applications where the afterglow must be avoided, the drain voltage must be set to a value at which no afterglow may be produced. In practice, the drain voltage VD is adjusted to a value selected for obtaining the highest detection sensitivity in view of the actual application and the actual permissible afterglow.

The present invention is directed to an image sensor consisting of a number of the above-described light sensor circuits arranged to form a matrix of pixels (i.e. light sensor circuits), wherein sensor signals from respective pixels are read by scanning in a time series and the pixels can be initialized in time adapted to the readout-scanning of respective sensor signals.

Figure 8:
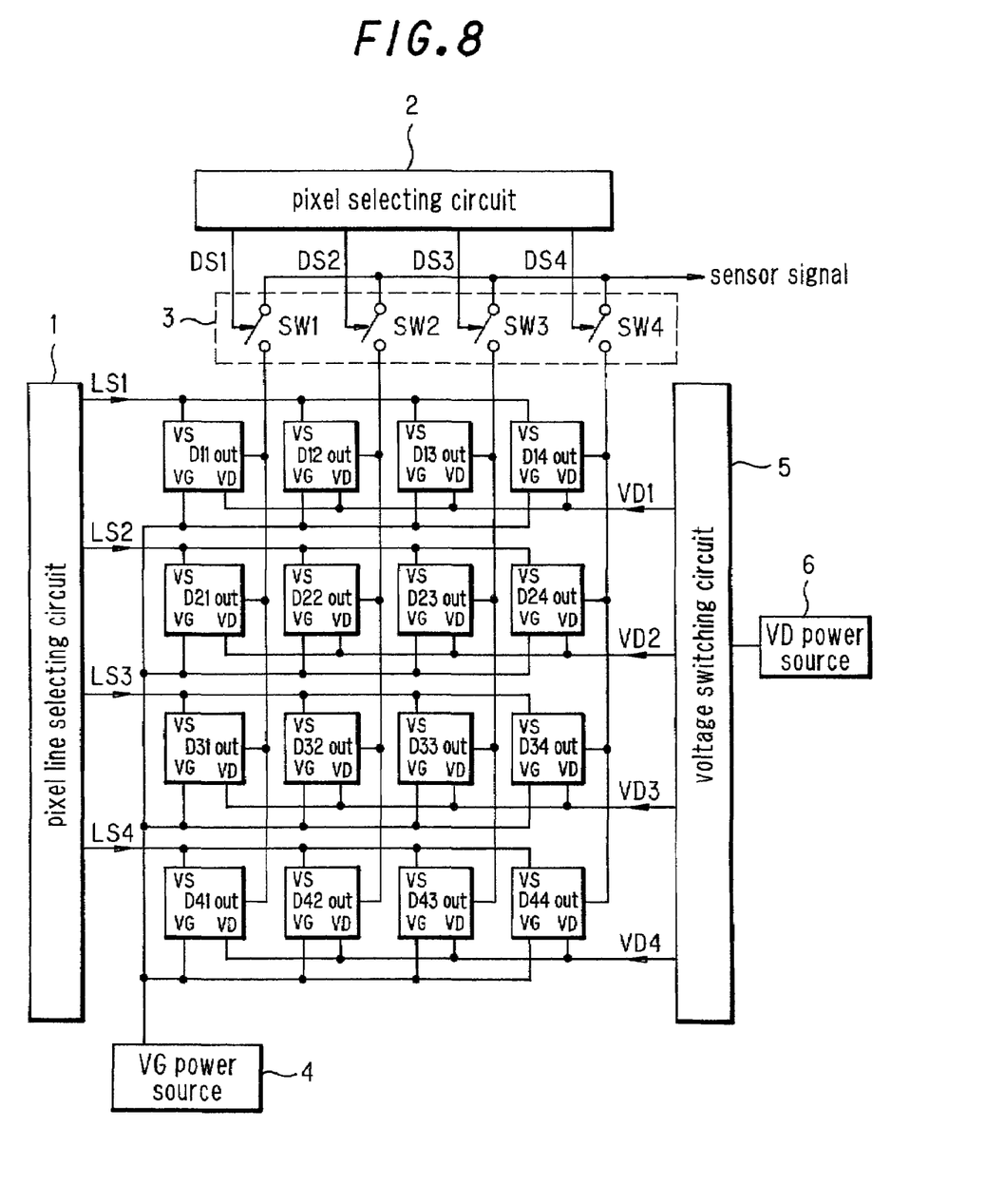
FIG. 8 is a block diagram of an image sensor according to an embodiment of the present invention.

FIG. 8 illustrates an image sensor according to an embodiment of the present invention.

The image sensor is composed of 4×4 pixels D11–D44 arranged in a matrix of pixel circuits, in which pixel lines are selected one by one with respective selecting signals LS1–LS4 successively output from a pixel line selecting circuit 1 and pixels in each selected pixel-line are readout one by one as respective sensor signals in such a manner that selecting signals DS1–DS4 successively output from a pixel selecting circuit 2 turn on corresponding switches SW1–SW4 to read sensor signals in a time series. In FIG. 8, numeral 4 designates a power source for gate voltage VG of the transistor Q1 and numeral 6 designates a power source for a drain voltage VD of the transistor Q1.

The image sensor of the present invention is provided with a voltage switching-over circuit 5 by which a drain voltage VD of each transistor Q1 for each pixel is changed from a normal high-level H to an initializing lower level L by the effect of a specified timing pulse when selecting each line of pixels.

Figure 9:
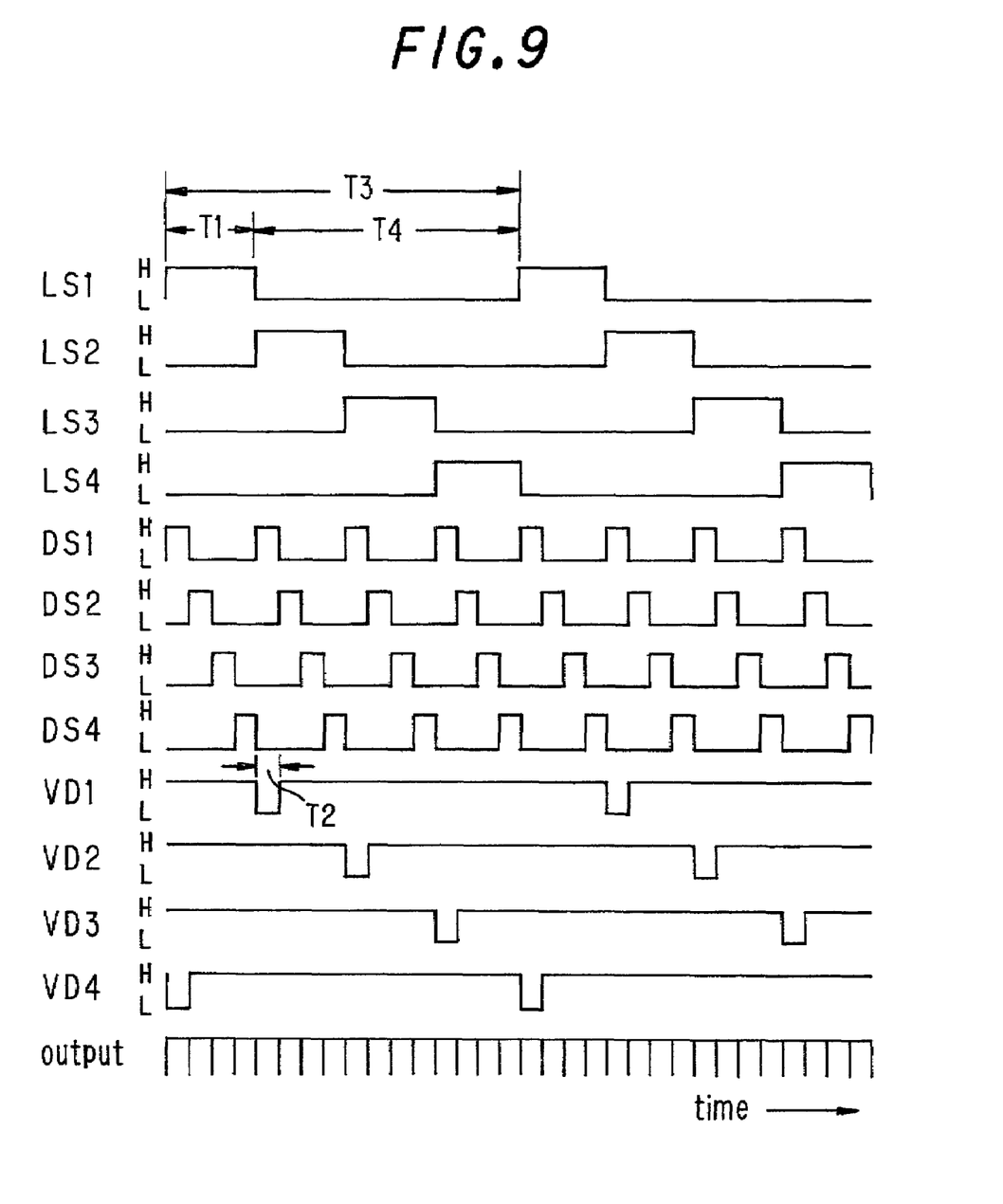
FIG. 9 is a time chart of signals from portions of the image sensor of the present invention.

The operation of the above-described image sensor according to the present invention will be described with reference to FIG. 9 showing a time chart of signals generated at respective portions of the image sensor.

Once the pixel-line selecting signal LS1 reaches the high level H, the first pixel line including pixels (light sensor circuits) D11, D12, D13 and D14 is selected and, during a specified period T1 of the signal LS1 remaining at the high level H, pixel selecting signals DS1–DS4 successively reach the high level H to start the successive reading of sensor signals from pixels D11, D12, D13 and D14.

As soon as the pixel-line selecting signal LS1 was changed to the low level, a next pixel-line selecting signal LS2 is changed to the high level H to select the second pixel line containing pixels D21, D22, D23 and D24. For a specified period (T1) of the signal LS2 remaining at the high level, the pixel selecting signals DS1–DS4 successively reach the high level H to start the successive reading of sensor signals from pixels D21, D22, D23 and D24.

Similarly, with the pixel-line selecting signals LS3 (LS4) changed to the high level H, the third (fourth) pixel line is selected and then, for a specified period (T1) for which the signal LS3 (LS4) remains at the high level H, the pixel selecting signals DS1–DS4 successively reaches the high level H to start the successive reading of sensor signals from pixels D31, D32, D33 and D34 (D41, D42, D43 and D44).

When the pixel-line selecting signal LSI was changed to the low level L, the drain voltage VD1 for the pixels D11, D12, D13 and D14 in the first selected line is turned to the low level for a specified period T2 to make the pixels initialized and prepared for the next cycle of reading sensor signals, which cycle will be performed with elapse of one cycle time T3.

When the pixel-line selecting signal LS2 was changed to the low level L after the period T1, the drain voltage VD2 for the pixels D21, D22, D23 and D24 in the second selected line is turned to the low level for the specified period T2 to initialize the pixels for the next sensor-signal reading cycle to be performed with elapse of one cycle time T3.

Similarly, once the pixel-line selecting signal LS3 (LS4) was changed to the low level L after the period T1, the drain voltage VD3 (V4) for the pixels D31, D32, D33 and D34 (D41, D42, D43 and D44) in the third (fourth) selected line is turned to the low level to initialize the pixels for the next sensor-signal reading cycle to be performed with elapse of one cycle time T3.

Although the drain voltage VDX is turned to the low level L to initialize each light sensor circuit with the pixel-line selecting signal LSX (X=1–4) decreased to the low level with elapse of the period T1, the initializing timing may be within the duration T4 for which the pixel line selection is paused with the pixel-line selecting signal being at the Low level L.

In initializing each pixel in the image sensor shown in FIG. 8, all pixels D11 to D44 may be initialized at the same time before reading sensor signals from respective pixels.

Figure 10:
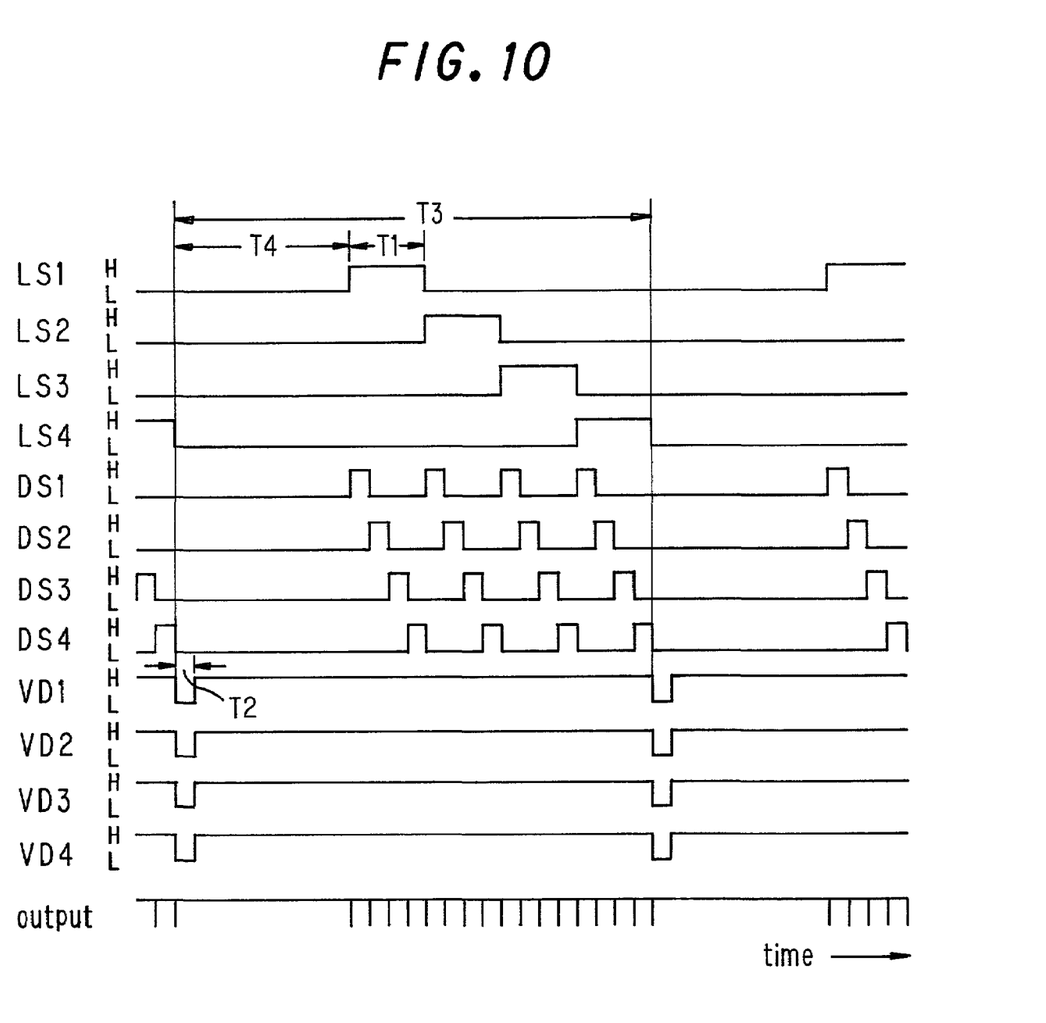
FIG. 10 is a time chart of signals from portions of the image sensor during the time of simultaneous initialization of all pixels in the image sensor.

FIG. 10 illustrates a time chart of signals generated at respective portions of the image sensor when all pixels D11–D44 are initialized at the same time.

The timing of occurrence of signals at respective portions is decided by driving the pixel-line selecting circuit 1, the pixel selecting circuit 2 and the voltage switching-over circuit 5 under the control from a control circuit (not shown).

Initializing each pixel at the timing adapted to scanning for reading each sensor signal may avoid an over or short charge-accumulating duration for a whole system of the image sensor.

Thus, according to the present invention, it is possible to realize an image sensor having a wide dynamic range of its logarithmic output characteristic without causing the afterglow of the pixels.

Figure 11:
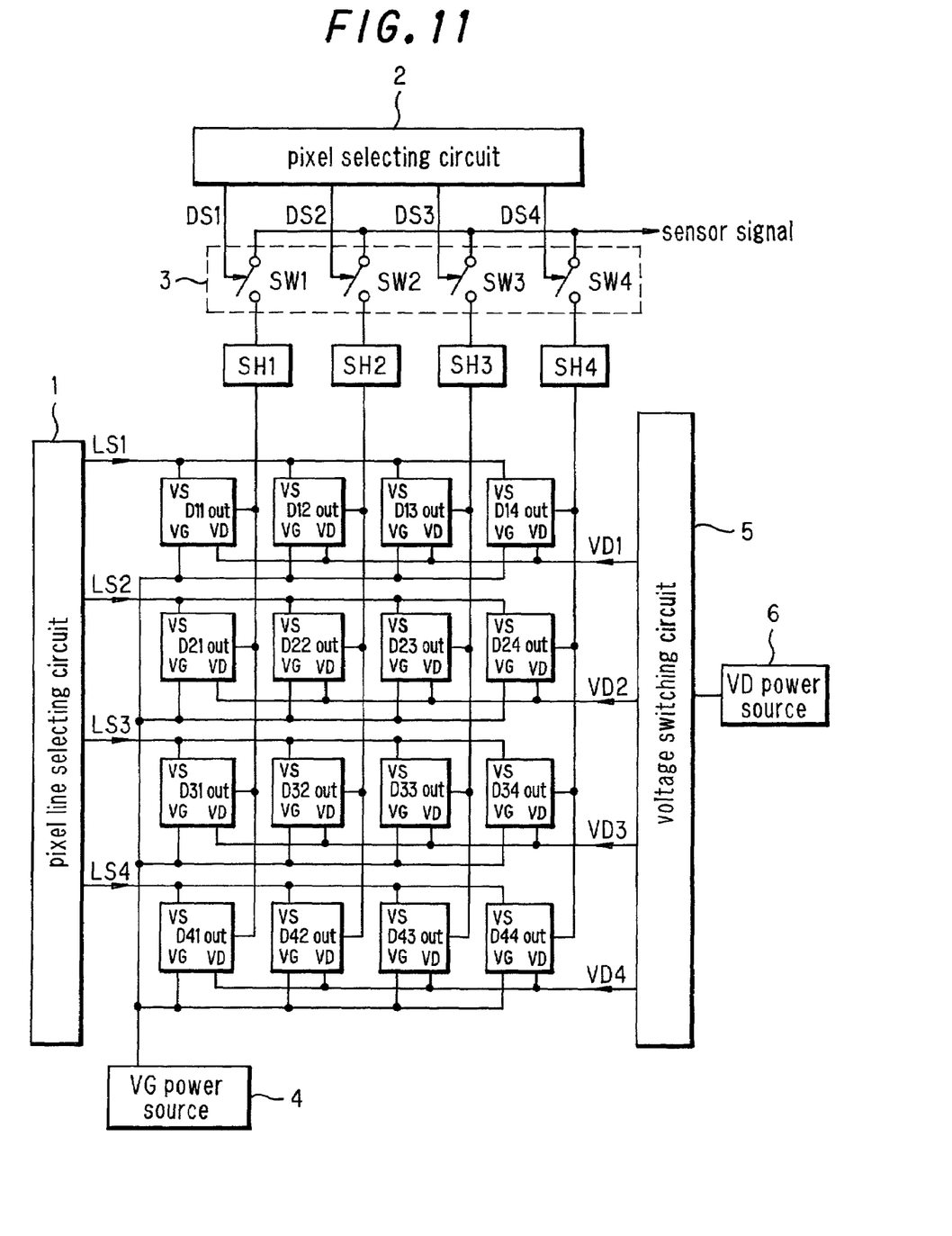
FIG. 11 is a block diagram of an image sensor according to another embodiment of the present invention.

FIG. 11 illustrates an image sensor according to another embodiment of the present invention.

In this case, sample-and-hold circuits SH1–SH4 are provided on the output side of pixels in respective selectable pixel lines.

Figure 12:
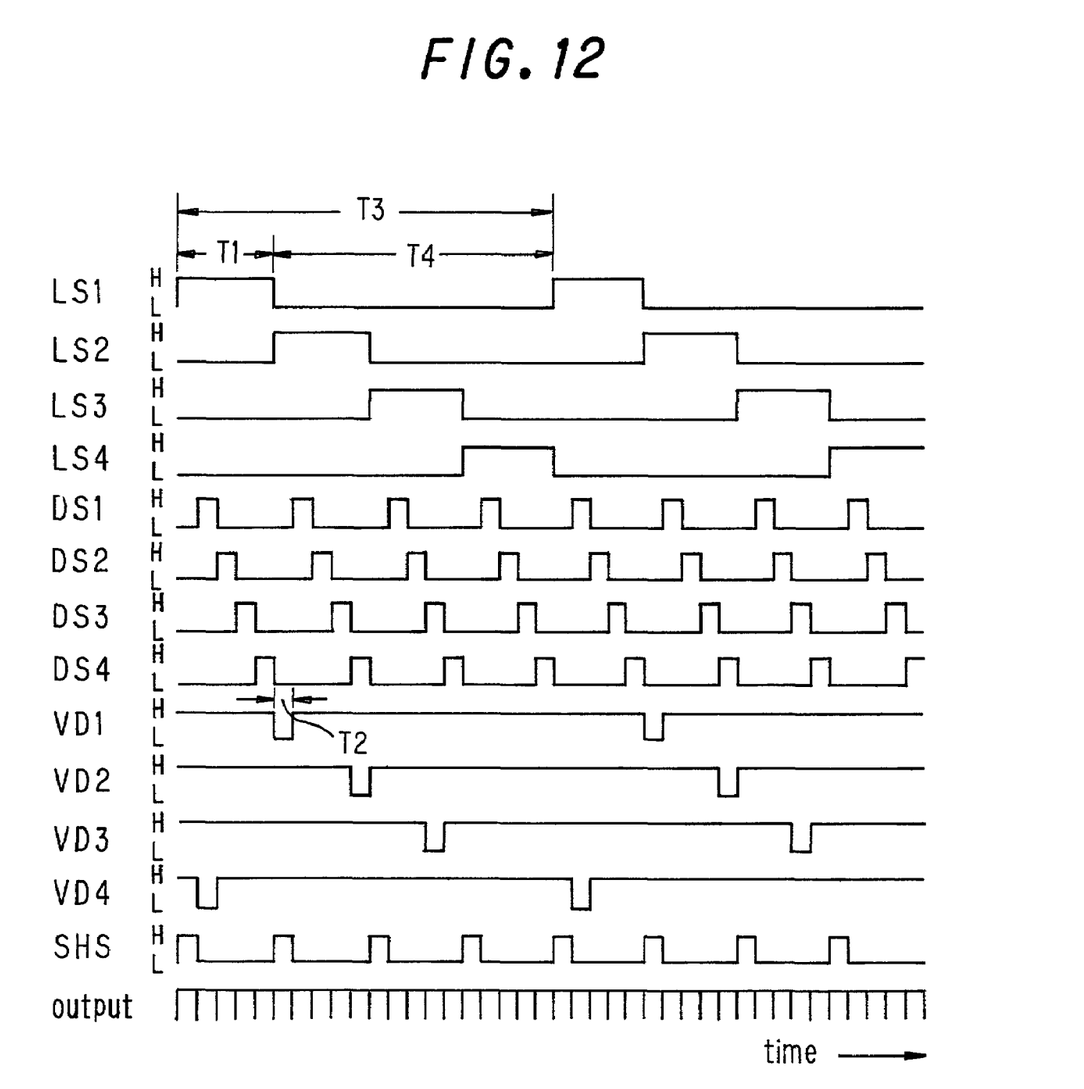
FIG. 12 is a time chart of signals from portions of the image sensor of the present invention.

As shown in FIG. 12, a sample-and-hold signal SHS is given to each of the sample-and-hold circuits SH1–SH4, which successively holds sensor signals for every pixel of one pixel line selected.

The image sensor thus constructed can stably output sensor signals from respective pixels in the selected pixel line.

An image sensor according to an aspect of the present invention uses a plurality of light sensor circuits arranged to form a matrix of pixels-circuits, each of which produces in a photoelectric converting element a sensor current proportional to the quantity of light falling thereon and converts the current into a voltage signal by a MOS type transistor having a logarithmic output characteristic in a weak inverse state. Each light sensor circuit is further provided with means for changing the drain voltage of the transistor to a value lower than a normal value for a specified time to initialize the circuit before detecting a light signal by removing a charge accumulated in a parasitic capacity of the photoelectric converting element, thereby obtaining a sensor signal without the effect of a residual charge.

An image sensor according to another aspect of the present invention is composed of a number of light sensor circuits arranged to form a matrix of pixels-circuits, each of which produces in a photoelectric converting element a sensor current proportional to the quantity of light falling thereon and converts the current into a voltage signal by using a MOS type transistor having a logarithmic output characteristic in a weak inverse state. Each light sensor circuit is further provided with a voltage switching-over circuit by which the drain voltage of the transistor is turned to a value lower than a normal level for a specified time to remove a charge accumulated in a parasitic capacity of the photoelectric converting element before detecting a light signal, thereby obtaining a sensor signal corresponding to the quantity of incident light even with a rapid change of the sensor current. This eliminates the possibility of occurrence of afterglow of every pixel with a small quantity of light falling thereon.

An image sensor according to a further aspect of the present invention is composed of a number of light sensor circuits arranged to form a matrix of pixels, a pixel-line selecting circuit for successively selecting pixel lines and a pixel selecting circuit for successively selecting pixels in each selected pixel line, wherein sensor signals can be scan and read from respective pixels in a time series. This image sensor is further provided with voltage switching-over circuits one for each light sensor circuit (pixel), by which the drain voltage of each MOS type transistor is turned to a value lower than a normal value for a specified time to remove a charge accumulated in a parasitic capacity of the photoelectric converting element before selecting each pixel line. The initialization of each pixel can be performed at timing adapted to reading of each sensor signal.

The invention claimed is:

1. An image sensor comprising a number of light sensor circuits arranged to form a matrix of pixels, each of said circuits being capable of producing in a photoelectric converting element a sensor current proportional to the quantity of light falling thereon and converting the produced current into a voltage signal by using a MOS type transistor with a logarithmic output characteristic in a weak inverse state, and a voltage switching-over circuit for changing a drain voltage of each of said MOS type transistors for each of said pixels to a value lower than a normal value for a specified time to remove a charge accumulated in a parasitic capacitance of the photoelectric element to thereby initialize the sensor circuit, wherein detection of a light signal from each sensor circuit is conducted at a specified moment of time after initialization of the sensor circuit.

2. An image sensor comprising a number of light sensor circuits arranged to form a matrix of pixels, each of said circuits being capable of producing in a photoelectric converting element a sensor current proportional to the quantity of light falling thereon and converting the current into a voltage signal by a MOS type transistor with a logarithmic output characteristic in a weak inverse state, a pixel-line selecting circuit for successively selecting pixel lines, a pixel selecting circuit for successively selecting pixels in one selected line, both of said selecting circuits cooperating together to successively scan and read sensor signals from respective pixels in a time series, and a voltage switching-over circuit for changing a drain voltage of each of said MOS type transistors for respective pixels in a selectable pixel line to a value lower than a normal value for a specified time to remove a charge accumulated in a parasitic capacitance of the photoelectric element before sequentially selecting individual pixels on each of the pixel lines, wherein for each pixel line, initialization of all the respective sensor circuits is conducted simultaneously during a pause state of the respective pixel line selecting circuit in which the respective pixel line selecting signal is at a low level.

3. An image sensor as defined in claim 1 or 2, characterized in that each of the light sensor circuits is composed of said MOS type transistor for converting a sensor current flowing in a photoelectric converting element to a voltage signal by using its logarithmic output characteristic in a weak inverse state, a second transistor for amplifying the voltage signal converted by said MOS type transistor and a third transistor for outputting a sensor signal corresponding to the voltage signal amplified by said second transistor for amplifying the voltage signal at a specified moment of time.

4. An image sensor as defined in claim 2, characterized in that a sample-and-hold circuit is provided on an output side of each pixel in each pixel line.

* * * * *